Patented May 12, 1931

1,805,194

UNITED STATES PATENT OFFICE

SHERMAN I. STRICKHOUSER, OF PASSAIC, NEW JERSEY, ASSIGNOR TO THE NAUGATUCK CHEMICAL COMPANY, OF NAUGATUCK, CONNECTICUT, A CORPORATION OF CONNECTICUT

TREATMENT OF ALDEHYDE-AMINES

No Drawing.  Application filed April 17, 1929.  Serial No. 355,984.

This invention relates to a method of treating aldehyde-amine condensation products and particularly those that are liable to deterioration. It also relates to the products thereof.

An object of this invention is to provide a class of chemicals which when added to aldehyde-amine condensation products as such or mixed with other substances will retard the deterioration of said products. A further object is to provide a process and product wherein the deterioration of aldehyde-amines, that are liable to deterioration, is substantially retarded.

Accordingly the invention comprises treating aldehyde-amine condensation products that are liable to deterioration when in contact with air, with a small amount of a poly hydroxy or substituted poly hydroxy aromatic body. The condensation product when so treated may be treated alone or where mixed with other substances. Notably these condensation products suffer deterioration where they are compounded with such as rubber as in the form of a master batch that awaits further treatment, and the invention provides a class of materials which will check or retard such deterioration. Typical of such materials are catechol, resorcinol, pyrogallol, chloro-hydroquinone, dichloro-hydroquinone, dinitroso-resorcinol, hydroquinone. Deterioration of the aldehyde-amine condensation products is manifest particularly where they are in contact with air. Whether the deterioration is caused by true oxidation or merely reformation of, or additions in, the condensation product is not definitely known, but the property of aldehyde-amines, of absorbing iodine provides a means of measuring the deterioration. The following examples illustrate the invention with the condensation product of heptaldehyde and aniline.

.10% of hydroquinone is added to the condensation product of heptaldehyde and aniline, preferably by first dissolving the hydroquinone in a small amount of the condensation product with the aid of heat and then adding the concentrated solution to the larger portion of condensation product. A similar example of the condensation product, without the addition of hydroquinone is used for comparison in the following test: The samples have air drawn through them for a period of 116 hrs. Iodine titration is carried out on the aerated sample, as well as on corresponding samples which have not been aerated. The iodine test is as follows: There is weighed out 2 one-gram portions of the sample to be tested in 100 c. c. beakers and dissolved in 20 cc. portions of benzol. To one gram portion is added 5 c. c. of $$\frac{N}{10}$$

iodine solution from a burette, stirring for 5 seconds, and testing for the end point by adding a drop or two of aqueous starch solution on a clean dry porcelain plate. 5 c. c. portions of iodine solution are continuously added until the condensation product solution gives a definite black-blue coloration with a drop of starch. When the end point is reached the solution is stirred about 15 seconds and retested. If the solution gives no end point at the end of the second period of stirring another 5 c. c. of iodine should be added and tested as before. This titration serves to fix the end point to the nearest 5 c. c. of $$\frac{N}{10}$$

iodine. Approximately the same amount of condensation product solution should be added to a drop of starch paste each time.

To the second one gram portion $$\frac{N}{10}$$

iodine is added rapidly to within 5 c. c. of the end point as determined in the first titration, stirring 30 seconds and testing with starch solution. The iodine solution is added 1 c. c. at a time until the end point is reached, stirring 5 seconds after such addition of iodine, and stirring 30 seconds longer after the end point is reached and retesting. If the mixture does not give a definite coloration after the second period of stirring another 1 c. c. portion of iodine should be added, stirred for 30 seconds and tested again. 1 c. c. excess of iodine solution should give an intense black coloration around the edge of the drop of starch paste. The following reference to iodine titration are expressed as ten times the number of c. c. of $$\frac{N}{10}$$

iodine absorbed per gram of aldehyde-amine condensation product.

Another method of testing is to vulcanize rubber with the condensation product before and after aeration and measuring the tensiles. Data obtained by these methods showing the protective action of hydroquinone are given below.

*Aerated and unaerated condensation product*

|  | Blank | % concentration of hydroquinone | | |
|---|---|---|---|---|
|  |  | .01 | .05 | .10 |
| Original titer | 465 | 465 | 445 | 435 |
| Titre after 116 hrs. aeration | 259 | 305 | 369 | 389 |
| Per cent loss | 44.3 | 34.4 | 17.1 | 10.5 |
| Per cent of original titre | 55.7 | 65.6 | 82.9 | 89.5 |

*Tensiles of rubber containing .05% of condensation product*

|  | Blank | % concentration of hydroquinone | | |
|---|---|---|---|---|
|  |  | .01 | .05 | .10 |
| 30′ at 40# at start | 2,010 | 2,190 | 2,445 | 2,300 |
| After aeration (116 hrs.) | 1,555 | 1,500 | 2,060 | 2,175 |
| 60′ at 40# at start | 2,460 | 2,340 | 2,335 | 2,550 |
| After aeration (116 hrs.) | 1,715 | 1,820 | 2,260 | 2,415 |
| % loss (average) | 26.3 | 26.8 | 9.3 | 5.4 |
| % of original accelerating value (average) | 73.7 | 73.2 | 90.7 | 94.6 |

The aldehyde amines which are subject to deterioration when in contact with air, when treated with a small amount of a poly hydroxy or substituted poly hydroxy substance, may be stored as such, or when present in a master rubber batch, be kept for a substantial period,—with little impairment of their qualities.

With the above detailed disclosure of the invention it is evident that numerous modifications will suggest themselves to those skilled in the art, and it is not desired to limit the invention otherwise than as set forth in the appended claims.

Having thus described my invention, what I claim and desire to protect by Letters Patent is:

1. The method of retarding the deterioration of aldehyde-amine condensation products which comprises treating said products with a poly hydroxy aromatic body.

2. The method of retarding the deterioration of aldehyde-amine condensation products in rubber batches which comprises mixing said products with rubber in the presence of a poly hydroxy aromatic body.

3. The method of retarding the deterioration of aldehyde-amine condensation products which comprises treating said products with a substituted poly hydroxy aromatic hydrocarbon.

4. The method of retarding the deterioration of aldehyde-amine condensation products in rubber batches which comprises mixing said products with rubber in the presence of a substituted poly hydroxy aromatic hydrocarbon.

5. The method of retarding the deterioration of aldehyde-amine condensation products which comprises treating said products with hydroquinone.

6. The method of retarding the deterioration of aldehyde-amine condensation products in rubber batches which comprises mixing said products with rubber in the presence of hydroquinone.

7. The method of retarding the deterioration of a heptaldehyde-aniline condensation product which comprises treating said product with a poly hydroxy aromatic body.

8. The method of retarding the deterioration of a heptaldehyde aniline condensation product in rubber batches which comprises mixing said product with rubber in the presence of a polyhydroxy aromatic body.

9. The method of retarding the deterioration of a heptaldehyde-aniline condensation product which comprises treating said product with hydroquinone.

10. The method of retarding the deterioration of heptaldehyde aniline condensation product in rubber batches which comprises mixing said products with rubber in the presence of hydroquinone.

11. As a new product an admixture containing an aldehyde-amine condensation product and a poly hydroxy aromatic body.

12. As a new product an admixture containing an aldehyde-amine condensation product and a substituted poly hydroxy aromatic body.

13. As a new product an admixture containing an aldehyde-amine condensation product and hydroquinone.

14. As a new product an admixture containing a heptaldehyde-aniline condensation product and a poly hydroxy aromatic body.

Signed at Passaic, county of Passaic, State of New Jersey, this 12 day of April, 1929.

SHERMAN I. STRICKHOUSER.